Figure 1:
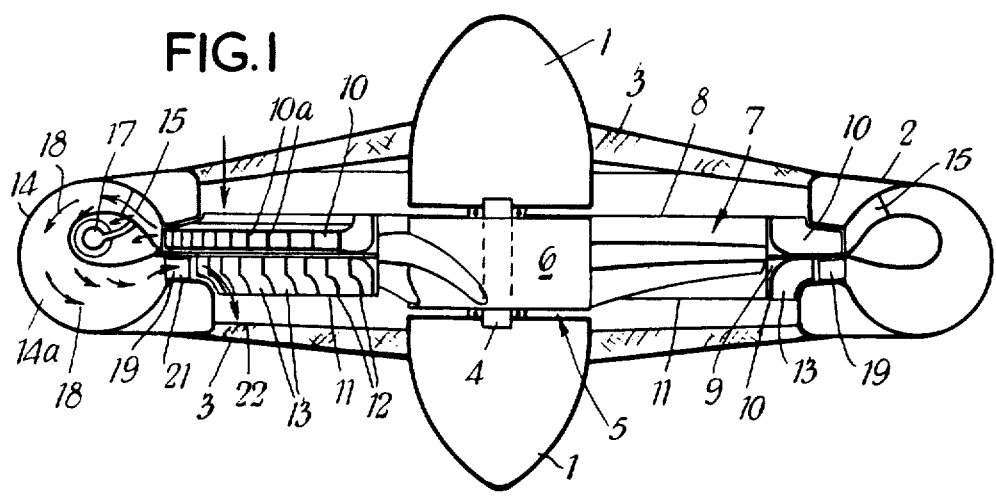

United States Patent [19]
Hansford

[11] 3,892,069
[45] July 1, 1975

[54] PROPULSION UNITS
[76] Inventor: Robert Julian Hansford, Sherwood Cottage, Clifton Reynes, Olney, Buckinghamshire, England
[22] Filed: Oct. 30, 1972
[21] Appl. No.: 301,819

[30] Foreign Application Priority Data
Nov. 5, 1971 United Kingdom............ 51607/71

[52] U.S. Cl.................... 60/226; 60/39.36
[51] Int. Cl................ F02k 3/02; F02c 3/08
[58] Field of Search. 60/226, 39.36, 39.43, 39.16 C, 60/262; 415/143

[56] References Cited
UNITED STATES PATENTS

| | | | |
|---|---|---|---|
| 2,689,681 | 9/1954 | Sabatiuk | 60/39.16 C |
| 2,924,937 | 2/1960 | Leibach | 60/39.36 |
| 3,269,120 | 8/1966 | Sabatiuk | 60/226 |
| 3,283,509 | 11/1966 | Nitsch | 60/226 |
| 3,310,940 | 3/1967 | Oetliker | 60/39.36 |
| 3,603,082 | 9/1971 | Sheeden | 60/39.36 |

*Primary Examiner*—C. J. Husar
*Assistant Examiner*—L. J. Casaregola
*Attorney, Agent, or Firm*—Stevens, Davis, Miller & Mosher

[57] ABSTRACT

A propulsion unit for an aircraft comprises rotor means incorporating a multi-bladed fan which over an outer peripheral region thereof defines centrifugal flow compressor passages and centripetal flow turbine passages and an annular combustor encircling the rotor means. The combustor has inlet means for directing air from the compressor passages into the combustor and outlet means for directing combustion gases from the combustor into the turbine passages to drive the rotor means.

10 Claims, 3 Drawing Figures

PROPULSION UNITS

This invention relates to propulsion units for aircraft and is more particularly but not exclusively concerned with a propulsion unit for short take-off and landing aircraft termed STOL and vertical take-off and landing aircraft termed VTOL.

In the current state of the art of gas turbine design, fan jet engines and fan lift engines are known in which the core engine is centrally located within the unit and the fan is disposed on the outside of the core engine rotating on the same axis. Proposals have been made in which an axial compressor and centripetal turbine are disposed on the rim of the fan in a single rotor element so that the fastest moving part of the fan i.e. its outer periphery, is used to compress and expand gas in a thermodynamic cycle. This method of axial compression is desirable since a high compression ratio can thereby be achieved.

It is however, an aim of the present invention to reduce the rotor thickness, weight and cost of such fan engines.

According to this invention there is provided a propulsion unit including rotor means incorporating a multi-bladed fan which over an outer peripheral region thereof defines centrifugal flow compressor passages and centripetal flow turbine passages and an annular combustor encircling the rotor means, the combustor having inlet means adapted to direct air from the compressor passages into the combustor and outlet means adapted to direct combustion gases from the combustor into the turbine passages to drive the rotor means.

Figure 2:
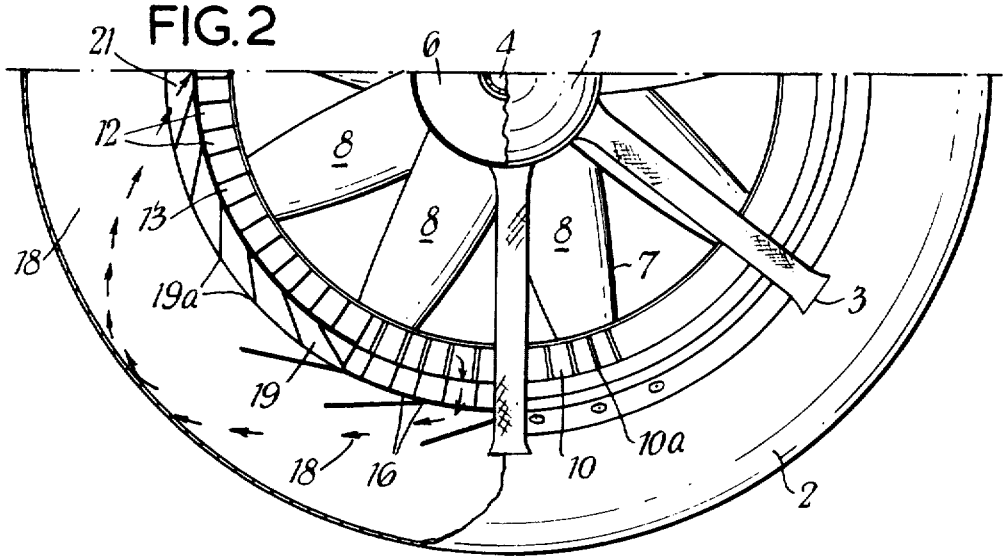
Figure 3:
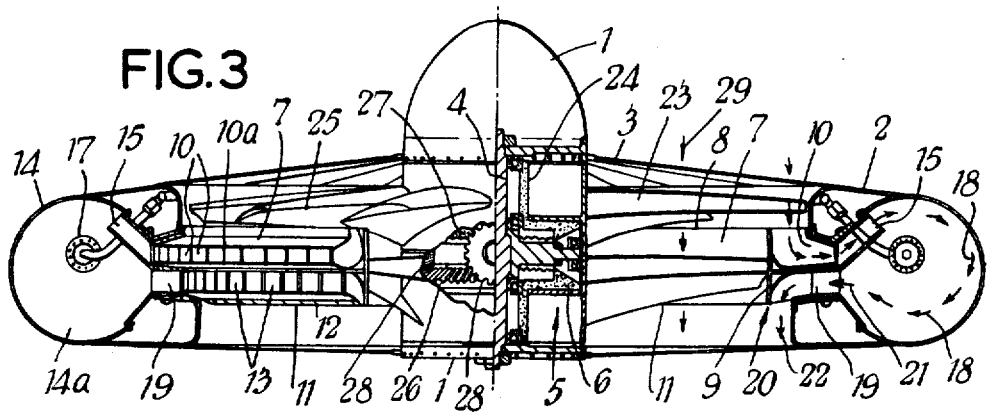

In order that this invention may be more fully understood, two constructions in accordance therewith will now be described, by way of example, with reference to the accompanying drawings, in which:

FIG. 1 is a propulsion unit for an aircraft having rotor means constituted by a single fan and a turbine driving wheel, FIG. 2 is a part plan view of the propulsion unit of FIG. 1, and FIG. 3 is another form of propulsion unit having rotor means constituted by two-contra-rotatable fans and a turbine driving wheel secured to one of the fans.

In the drawings, the same reference numerals are used to indicate the same or similar parts.

Referring to FIGS. 1 to 3 of the drawings, each of the propulsion units shown comprises a hub 1 and a circular shrouding 2 which concentrically surrounds and is displaced from the central hub 1. The shrouding 2 is connected to the hub 1 by a series of radially extending spokes 3 each of which is connected at one of its ends to one axial end of the hub 1 and which extends around the shrouding 2 and is connected at its other end to the other axial end of the hub 1. Those parts of the hub 1 to which the spokes 3 are connected are fixed to an axle 4 on which rotor means generally indicated at 5 is rotatably mounted.

The rotor means 5 comprises a hub portion 6 and a fan 7 comprising a series of blades 8 which extend radially from the hub portion 6. The blades 8 are of aerofoil section and are pitched so that rotation in a clockwise direction produces lift. The pitch of the blades 8 may be altered to vary the lift as desired.

As shown in FIG. 1, the propulsion unit incorporates an air intake leading to a series of circularly distributed centrifugal flow compressor passages 10 and having an annular opening which is disposed adjacent the periphery of the fan and which has an internal diameter equal to the fan blade diameter.

Mounted concentrically with the fan tips and secured thereto is a T-shaped, in cross-section, circular member 9 having blades 10a secured thereto which define the series of circularly distributed centrifugal flow compressor passages 10. The rotor means further comprises a turbine wheel 11, secured to the hub portion 6 and defining between blades 12 secured to the member 9, a series of circularly distributed centripetal flow turbine passages 13. It will be appreciated that the passages 10 and 13 are radially directed and that the respective flow directions of the gases passing therethrough are radially outwardly and radially inwardly of the axle 4. It will also be appreciated that the blades 10a and 12 defining the compressor and turbine passages 10 and 13 are arranged on opposite sides respectively of the leg of the T-shaped member 9.

The shrouding 2 incorporates an annular combustor 14 which is of substantially toroidal shape and defines a combustion chamber 14a of part circular cross-section. The combustor 14 is provided along its inner diameter with a series of tangentially directed inlets 15 defined by diffuser vanes 16 (see FIG. 2). The inlets 15 are adapted to direct air from the compressor passages 10 into the combustor 14. Mounted in the combustion chamber 14a towards the upper portion thereof is a fuel supply and ignition means in the form of an annular burner 17. The fuel supplied may be oil, gas or any other suitable fuel. The combustor 14 is also provided with a series of circularly distributed and tangentially directed outlets 19, defined by vanes 19a, in the form of turbine nozzles which are adapted to direct combustion gases from the combustor 14 into the turbine passages 13 to drive the rotor means 5. The combustion gases are exhausted from the passages 13 at 20. Instead of the inlets 15 and outlets 19 being tangentially directed, they may be disposed at any other appropriate angle to the radius of the combustor. Also, the inlets 15 and the outlets 19 may be of arcuate or any other suitable shape.

Referring to FIG. 3, the rotor means comprises an additional fan 23 which is separately mounted on the axis 4, through its own hub portion 24. Similarly to the fan 7, the fan 23 comprises a series of variable pitch blades 25 of aerofoil section but oppositely pitched to the blades 8 of the fan 7, so that rotation in an anticlockwise direction produces lift. Each hub portion 6,24 of the two fans 7 and 23 comprises a circular rack 26,27 and a number of pinions 28 which drivably connect the racks 26 and 27 to each other such that rotation of the fan 7 causes rotation of the fan 23, in the opposite direction.

In operation of the propulsion units described when the rotor means 5 is rotated, air displaced by fan 7, is centrifuged outwards and is thus compressed in the centrifugal flow compressor passage 10. The air is thus forced into the combustion chamber 14a through the inlets 15. The tangential direction of the inlets 15 and the shape of the combustion chamber 14a ensures that the air flowing within the combustion chamber follows a flow path in the form of a circular spiral as indicated by the arrows 18. During flow through the combustion chamber 14a the air heated by combustion of the fuel flows into the outlets 19 as indicated by the arrows 21 and thence into the turbine passages.

The combustion gases impinge upon the blades of the turbine thus causing rotation of the fan 7. Rotation of the fan 7 causes more air to be centrifuged into the passages 10 and thus into the combustion chamber inlets 15, and a continuous operating cycle of the propulsion unit is thereby achieved. The speed of rotation of the composite rotor means is controlled by the amount of fuel fed to the burner 17. The combustion gases are exhausted from the turbine at 20 and have an axial direction of flow as indicated by the arrows 22 to provide lift.

In the embodiment of FIG. 3, the additional fan 23 causes air to be directed axially towards the fan 7, the action of which assists the fan 7 in supplying air to the centrifugal flow compressor passages 10 (see arrows 29 in FIG. 3).

A plurality of the single fanned versions of FIGS. 1 and 2 will normally be used in a single aircraft for example, mounted in pairs with the single fans or compressors of the respective pairs being caused to rotate in opposite directions. This is to offset the torque reaction of the single fan or disc rotor which requires a tail rotor fan in helicopter practice.

The propulsion units described enable aircraft to take off and land vertically and to benefit from the exhausted combustion gases and air passing axially through the unit(s) to make a very soft landing.

Control of the propulsion units described may be by any conventional known means.

It will be appreciated that the configuration of combustor described may be used with rotor systems for many applications.

I claim:

1. A propulsion unit including rotor means incorporating a multi-bladed fan which over an outer peripheral region thereof defines centrifugal flow compressor passages and centripetal flow turbine passage and an annular combustor encircling the rotor means wherein the upstream ends of the compressor passages are located in a circular pattern around the rotor means, and immediately radially adjacent the ends of the fan blades so that the flow path of air entering the compressor passages and the flow paths of air passing between the blades of the fan are adjacent one another at the ends of the fan blades, the combustor having inlet means adapted to direct air from the compressor passages into the combustor and outlet means adapted to direct combustion gases from the combustor into the turbine passages to drive the rotor means.

2. A unit as set forth in claim 1, in which the combustor is of substantially toroidal shape.

3. A unit as set forth in claim 1, in which the inlet and outlet means are directed tangent to the combustor.

4. A unit as set forth in claim 1, in which means are provided for supporting the combustor from a central member on which the rotor means is rotatably mounted.

5. A unit as set forth in claim 4, in which the combustor support means comprises a circular shrouding which concentrically surrounds and is displaced from the central member and a series of radially extending spokes connecting the shrouding to the central member.

6. A unit as set forth in claim 1, in which the compressor and turbine passages are defined by a circular member which comprises the outer periphery of the rotor means.

7. A unit as set forth in claim 6, in which the circular member comprises a portion which is T-shaped in axial cross-section and two sets of blading respectively defining the compressor and turbine passages and disposed on opposite sides respectively of the leg of the T.

8. A unit as set forth in claim 1, in which the compressor and turbine passages extend radially from the rotor means.

9. A unit as set forth in claim 1, in which the rotor means comprises a second fan which is geared to the first mentioned fan for rotating said second fan in the opposite direction from the first fan.

10. A unit as set forth in claim 1, in which the combustor inlet and outlet means are defined by diffuser and turbine nozzle vanes respectively.

* * * * *